W. J. LINEHAM, DEC'D.
R. S. WEDELL, EXECUTRIX.
THRUST ABUTMENT FOR LEAD SCREWS.
APPLICATION FILED MAR. 3, 1919.
1,330,881. Patented Feb. 17, 1920.
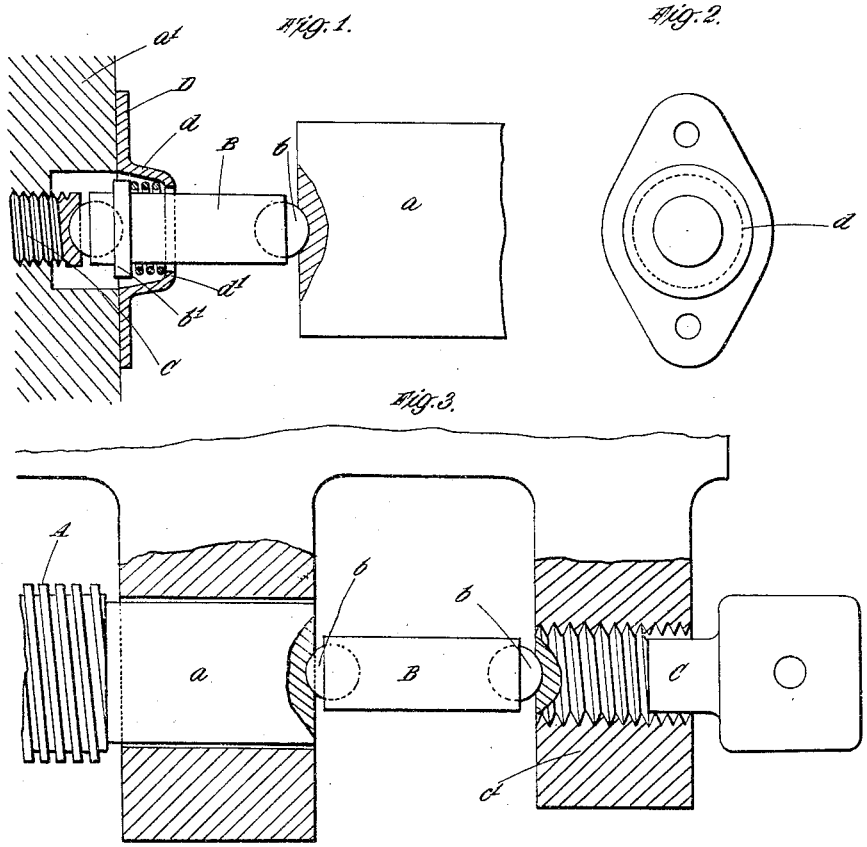

UNITED STATES PATENT OFFICE.

WILFRID JAMES LINEHAM, OF LEE, ENGLAND, RACHEL SOMERVILLE WEDDELL EXECUTRIX OF SAID WILFRID JAMES LINEHAM, DECEASED.

THRUST ABUTMENT FOR LEAD-SCREWS.

1,330,881.   Specification of Letters Patent.   Patented Feb. 17, 1920.

Application filed March 3, 1919. Serial No. 280,429.

*To all whom it may concern:*

Be it known that I, WILFRID JAMES LINEHAM, a subject of the King of Great Britain, residing at 21 Newstead road, Lee, in the county of Kent, England, have invented certain new and useful Improvements in or Relating to Thrust Abutments for Lead-Screws, of which the following is a specification.

This invention relates to screw cutting lathes or like machines where high accuracy is required and provides an improved abutment for taking the thrust of the lead screw, which considerably reduces errors due to the imperfect alinement.

According to this invention the thrust is taken through a small strut or rod provided with a spherical bearing surface at each end and disposed coaxially with respect to the lead screw. The use of a ball to take the thrust of a lead screw in order to eliminate periodic errors is known, but the double spherical surfaces separated by a rod or strut which can adjust itself angularly to any inaccuracies in alinement prevents such inaccuracies substantially affecting the work, so that screws can be cut to a very high degree of accuracy by means of a lathe provided with this device.

In order that the said invention may be clearly understood and readily carried into effect, I will describe the same more fully with reference to the accompanying drawings, in which:—

Figure 1 shows in elevation and partly in section a typical device embodying this invention. In this construction the slide is pushed by the leading screw as in certain chasing machines.

Fig. 2 is a detail view of a cap for the strut, the object being to prevent the strut falling away while yet providing freedom of action; and Fig. 3 shows a modification as used in ordinary screw cutting lathes, the leading screw being in thrust.

A is the lead screw, terminating in the plain end $a$. B is the strut provided with the spherical face $b$ at each end. C is an adjustable abutment member for the outer end of the strut B.

In the construction shown the spherical ends $b$ of the strut are in the form of separate balls within suitable cavities in the strut, the outer surfaces of these balls lying in concave seatings in the lead screw and the adjustable member C. The abutment member C may be stationary or may be on a movable slide. In Fig. 1 it is in the form of a screwed rod adjustable longitudinally within the slide $a'$ and the strut is held in position by means of the small cap or bracket D fitted on the face of the slide $a'$, and having a conical portion $d$ fitting around the strut. A light spring $d'$ is placed within the cone and bears on the collar $b'$ on the strut B.

It will be seen that if there is any inaccuracy of alinement between the lead screw and the member C, the strut with its spherical ends will adapt itself to such want of alinement and no very appreciable inaccuracy in the work will be introduced as the lead screw is turned.

In Fig. 3 the abutment member C is in the form of a screwed plug adjustable within the supporting bracket $c'$ fitted on the frame of the lathe.

What I claim and desire to secure by Letters Patent of the United States is:—

1. In a lathe or like machine for cutting screws of high accuracy, the combination with a lead screw, of a strut for taking the thrust of the lead screw, which strut is provided with a spherical surface at each end and disposed coaxially with respect to the lead screw, for the purpose specified.

2. In a lathe or like machine for cutting screws of high accuracy, the combination with a lead screw, of a strut for taking the thrust of the lead screw, provided at each end with a ball adapted to lie in a concave seating in the end of the screw and in an abutment respectively, for the purpose specified.

WILFRID JAMES LINEHAM.

Correction in Letters Patent No. 1,330,881.

It is hereby certified that the name of the grantee in Letters Patent No. 1,330,881, granted February 17, 1920, upon the application of Wilfrid James Lineham, of Lee, England, for an improvement in "Thrust Abutments for Lead-Screws," was erroneously written and printed as "Rachel Somerville Weddell, executrix," whereas said name should have been written and printed as *Rachel Somerville Weddell Lineham, executrix*, as shown by the records of assignments in this office; and that the said Letters Patent should be read with this correction therein that the same may conform to the record of the case in the Patent Office.

Signed and sealed this 22d day of June, A. D., 1920.

[SEAL.]

M. H. COULSTON,
*Acting Commissioner of Patents.*

Cl. 82—27.